United States Patent [19]
Jensen

[11] Patent Number: 4,894,145
[45] Date of Patent: Jan. 16, 1990

[54] AUTOMATIC CONTROL OF FEEDSTOCK VACUUM TOWERS

[75] Inventor: Bruce A. Jensen, Bartlesville, Okla.

[73] Assignee: Applied Automation, Inc., Bartlesville, Okla.

[21] Appl. No.: 221,484

[22] Filed: Jul. 19, 1988

[51] Int. Cl.⁴ .............................................. B01D 3/42
[52] U.S. Cl. .................................... 208/350; 208/355; 208/358; 208/DIG. 1; 203/2; 202/160
[58] Field of Search ............... 208/347, 350, 355, 358, 208/DIG. 1; 203/1, 2; 202/160; 196/132; 364/501

[56] References Cited

U.S. PATENT DOCUMENTS

| | | |
|---|---|---|
| 3,310,487 | 3/1967 | Johnson et al. ................ 208/358 X |
| 3,338,825 | 8/1967 | Taggart ............................... 208/350 |
| 3,365,386 | 1/1986 | Van Pool ........................... 208/355 |
| 3,401,092 | 9/1968 | Matta ..................................... 203/2 |
| 3,403,725 | 8/1969 | Macfarlane et al. ................... 203/2 |
| 3,600,282 | 8/1971 | Lupfer et al. ...................... 202/160 |
| 4,007,112 | 2/1977 | Benker et al. ................. 208/DIG. 1 |
| 4,555,309 | 11/1985 | Jain ........................................ 203/2 |
| 4,560,442 | 12/1985 | Jain ........................................ 203/2 |
| 4,578,151 | 3/1986 | Soderstrom, III et al. ... 208/DIG. 1 |

Primary Examiner—Glenn Caldarola
Attorney, Agent, or Firm—Laney, Dougherty, Hessin & Beavers

[57] ABSTRACT

In a fractional distillation tower which is divided into a plurality of sections by total drawoff trays, and wherein at least one fraction is withdrawn from each section. The cut point temperature between fractions is determined based on the partial pressure and temperature of the vapor in the upper portion of a section. The thus determined cut point temperature may be compared to a set point with the results of the comparison being utilized to maintain the actual cut point temperature between fractions substantially equal to the desired cut point temperature.

15 Claims, 2 Drawing Sheets

AUTOMATIC CONTROL OF FEEDSTOCK VACUUM TOWERS

This invention relates to process control. In one aspect it relates to apparatus for controlling a continuous fractional distillation process in which one or more sidecut fractions are withdrawn from a distillation tower in addition to an overhead and a bottoms fraction. In another aspect it relates to a method for maintaining a desired cut point temperature between fractions withdrawn from the distillation tower.

BACKGROUND OF THE INVENTION

In a typical fractional distillation process, a feed stream containing at least first and second components is supplied to a tower. The tower is so constructed that rising vapors pass upward through layers of condensate on a series of plates. The vapor passes from one plate to the next above by bubbling under caps and out through the liquid on the plate. The less volatile (heavier) portions of the vapor condense in bubbling through the liquid on the plate, and excess liquid overflows the plate on which it was condensed and passes to the next lower plate through passages called downcomers. Ultimately the heavier portions flow to the bottom of the tower, and separation of the light and heavy fraction is thereby affected.

A substantial portion of the lighter component contained in a feedstream is removed from the distillation column as an overhead product and a substantial portion of the heavier component in the feedstream is removed from the distillation column as a bottoms product. Heat is generally supplied for the fractional distillation process either by preheating the feed to a desired temperature or by supplying heat directly to the tower.

Fractional distillation towers are also employed in many processes to make more complex multiple component separations. Complex separations are often performed in vacuum towers so that the boiling temperature is reduced sufficiently to prevent cracking of the material being distilled. A special class of fractionation processes are carried out in feedstock vacuum towers in which a distillation tower is divided into sections by one or more total drawoff trays. As used herein a total drawoff tray is a tray in a tower which has its downcomer passage sealed and from which all the liquid fraction is removed as a sidestream. Feedstock vacuum towers are used for distilling broad boiling range hydrocarbon streams, for example, from the residue of a crude oil distillation process. These columns separate out an overhead vapor fraction, a bottoms liquid fraction and at least one intermediate boiling range or so called sidecut fraction. The sidecut fraction which is withdrawn in a sidestream can be utilized as a feedstock for another process unit such as a cat cracker.

In this sectionalized tower the top section is refluxed with a portion of the overhead liquid product, and each of the lower sections is refluxed with a portion of the respective sidestream withdrawn from that section. Each sidestream is withdrawn laterally in liquid form at different levels within the tower and each sidestream is characterized by its cut point temperature and associated boiling point range. As used herein the cut point temperature is the boiling temperature division between cuts of the feedstock.

A preheated hydrocarbon mixture is fed into the feedstock vacuum tower at a predetermined flow rate and then abruptly expanded, thus causing vaporization of the major fraction of the hydrocarbon mixture. The vapors obtained rise within the column and are washed by down flowing liquid reflux which was previously fed back to the top of each section of the tower. As previously stated one or more sidestreams are withdrawn from the feedstock vacuum tower.

In the past it has been common practice to control separations between the cut point temperature of the sidestreams by manipulating internal reflux flow rates in the column in response to a load curve, wherein the load curve is utilized to predict the required internal reflux as a function of the feed rate. However with control systems based directly on internal reflux, the external refluxes must be manipulated slowly to avoid interactions between product quantity controllers and external reflux controllers and to avoid interactions between different reflux controllers. Control schemes based on load curves are satisfactory if the magnitude and frequency of disturbance caused for example, by changes in feed composition, feed temperature, tower pressure, etc., are low. However, when the frequency of disturbances is high, the slow manipulation of the external reflux causes disturbances to propagate in the distillation tower which leads to unstable operation in general and in particular leads to off specification conditions for the sidedraw products.

It is thus an object of this invention to control a feedstock vacuum tower so as to maintain a desired separation between cut points of fractions withdrawn from the tower in order to maximize the yield of a more valuable fraction.

It is a further object of this invention to base manipulation of external reflux streams on measured temperatures and pressures found in the tower so as to stabilize the liquid loads in each section of the tower.

SUMMARY OF THE INVENTION

In accordance with this invention, method and apparatus are provided for determining, on-line, the cut point temperature between fractions withdrawn from a distillation tower. Conveniently, the cut point temperature is inferred from the actual vapor temperature and vapor pressure within a section of the tower from which a sidecut fraction is withdrawn. The thus determined cut point temperature, which can be adjusted, is compared to a set point with the results of the comparison utilized to manipulate a process variable so as to maintain the actual cut point between fractions substantially equal to a desired cut point. In this manner the cut point specification for the sidecut fraction may be met and also the cut point may be adjusted so as to maximize the yield of a more valuable fraction.

In a specific and presently preferred embodiment of this invention, the vapor pressure and temperature at the top of the tower, and the tray pressure, vapor temperature and the liquid level for each of four sections of a feedstock vacuum tower are measured. The production rate for each fraction withdrawn from the tower is set from a level controller associated with the respective fraction, and the cut point between fractions is controlled by manipulating the reflux flow in the respective section of the tower responsive to the inferred cut point.

Other objects and advantages of the invention will be apparent from the foregoing brief description of the invention and from the claims as well as from the detailed description of the drawing which are briefly described as follows.

DESCRIPTION OF THE PREFERRED EMBODIMENT

The invention is illustrated and described in terms of a feedstock vacuum tower providing two sidecut fractions. However the invention is applicable to any fractional distillation process wherein sidestreams are withdrawn from the distillation process and an external reflux stream associated with the sidestream is returned to the fractional distillation process. Other examples of such processes include catalytic cracking fractionators, hydrodesulfurizing fractionators and coker fractionators.

Figure 1:
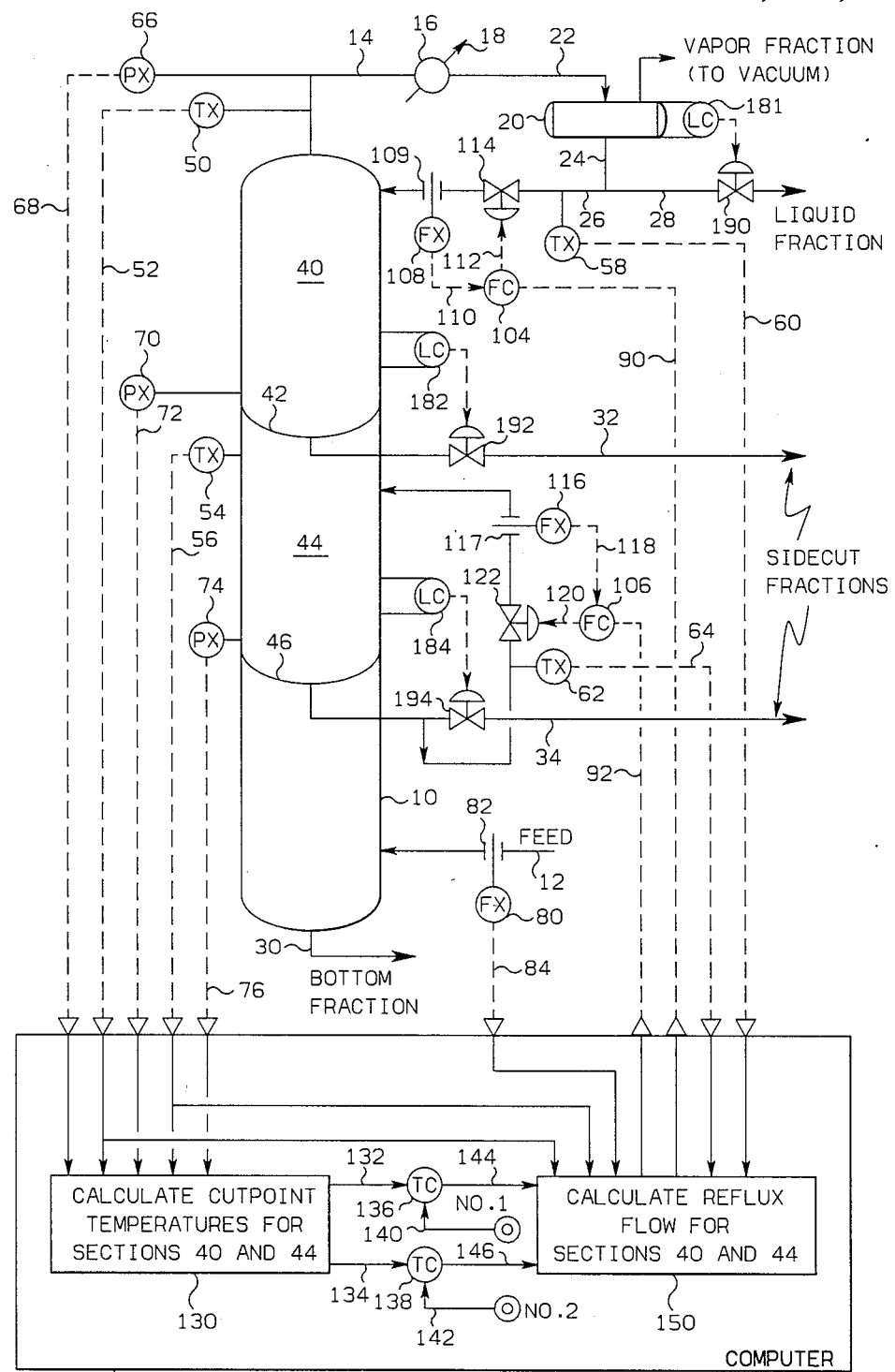
FIG. 1 is a diagrammatic illustration of a fractional distillation process and the association control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The digital computer used was an OPTROL 7000 Process Computer System from Applied Automation, Inc., Bartlesville, Okla.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention is implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a vacuum distillation tower 10. A wide boiling range hydrocarbon mixture such as the residue from a crude tower is provided to the tower 10 through conduit means 12. The feed flowing through conduit means 12 will generally be preheated and, for the vacuum tower to which the present invention was applied, the feed was heated to the point that the desired separation could be accomplished without additional heat being supplied to the vacuum tower 10.

An overhead vapor stream is withdrawn from the upper portion of the distillation tower 10 through conduit means 14 and is provided to heat exchanger 16. The heat exchanger 16 is provided with a cooling medium flowing through conduit means 18 which partially condenses the vapor flowing in conduit means 14. The partially condensed fluid stream flowing from heat exchanger 16 is provided to the overhead accumulator 20 through conduit means 22. Liquid in the accumulator 20 is withdrawn through conduit means 24. A portion of the liquid flowing through conduit means 24 is provided as an external reflux to distillation tower 10 through the combination of conduit means 24 and 26. The liquid flowing through conduit means 24 is also provided as an overhead liquid fraction withdrawn from distillation tower 10 through the combination of conduit means 24 and 28.

The tower 10 illustrated in FIG. 1 is divided into three sections. An upper section 40 is defined as the volume included from the top of the tower to the location of a total drawoff tray 42 conveniently located in the upper half of the tower 10. Section 40 includes a liquid zone and a vapor zone. A second section 44 is defined as the volume from the first section total drawoff tray 42 to the total drawoff tray 46 which is conveniently located in the lower half of the distillation tower 10. The second section 42 also includes a liquid zone and a vapor zone. As previously indicated the distillation tower 10 may be divided into additional sections to provide additional sidecut fractions as desired. However, withdrawal of the additional fractions is not illustrated in FIG. 1 since a method of control for the illustrated sidecut fractions is identical to the control for any additional sidecut fractions.

As illustrated in FIG. 1 a sidecut fraction which is typically a heavy vacuum gas oil is withdrawn from the upper section 40 of distillation tower 10 through conduit means 32. Another sidecut fraction, which is typically utilized as a FCCU feedstream is withdrawn from section 44 of distillation tower 10 through conduit means 34. A portion of the sidecut fraction withdrawn from distillation tower 10 through conduit means 34 is returned to the upper portion of section 44 as a liquid reflux stream through conduit means 36. A bottom fraction is withdrawn from distillation tower 10 through conduit means 30.

The manner in which the distillation tower 10 illustrated in FIG. 1 is controlled in accordance with this invention is as follows:

Temperature transducer 50 in combination with a temperature sensing device such as a thermocouple which is operably located in the overhead vapor stream flowing in conduit means 14, provides an output signal 52 which is representative of the temperature of the fluid flowing in conduit means 14. Signal 52 is provided from the temperature transducer 50 as an input to computer 100. In a similar manner temperature transducers 54, 58 and 62 respectively provide signals 56, 60 and 64 which are respectively representative of the temperature of the vapor in section 44 of tower 10, the temperature of the fluid flowing in conduit means 26, and the temperature of the fluid flowing in conduit means 36. Signals 52, 60 and 64 are provided as inputs to computer 100.

Pressure transducer 66 in combination with a pressure sensing device operably located in conduit means 14 provides an output signal 68 which is representative of the vapor pressure of the fluid in the top of the distillation tower 10. Signal 68 is provided from pressure transducer 66 as an input to computer 100. In a similar manner pressure transducers 70 and 74 respectively provide signals 72 and 76 which are representative of the pressure within the tower 10 at the total drawoff trays 42 and 46 respectively. Signals 72 and 76 are provided as inputs to computer 100.

Flow transducer 80 in combination with flow sensor 82 which is operably located in conduit means 12 provides an output signal 84 which is representative of the actual flow rate of the feed through conduit means 12. Signal 84 is also provided to computer 100.

In response to the above-described input signals computer 100 outputs control signals 90 and 92 which are representative of the desired reflux flow rate for sections 40 and 42 respectively of distillation tower 10. Signal 90 is provided from computer 100 as a set point input to reflux controller 104. Signal 92 is provided as a set point signal to reflux flow controller 106.

As will be explained more fully hereinafter, computer 100 calculates two cut point temperatures in computer block 130 and provides the results of the calculation as signals 132 and 134. Signals 132 and 134 are utilized as process variable input signals to cut point controllers 136 and 138 respectively. Controllers 136 and 138 are also provided with set point signals 140 and 142 respectively. The output of controllers 136 and 138 are provided to the calculated reflux flow computer block 150 via signals 144 and 146. Signals 144 and 146 are scaled so as to be representative of the internal reflux ($R_i$) to feed ratio for the associated section of the tower.

Flow transducer 108 in combination with flow sensing device 109, which is operably located in conduit means 26, provides an output signal 110 which is representative of the actual flow rate of fluid in conduit means 26. Signal 110 is provided as a process variable input to reflux flow controller 104. In response to signals 110 and 90 flow controller 104 provides an output signal 112, which is responsive to the difference between signals 110 and 90. Signal 112 is scaled so as to be representative of the position of control valve 114, which is operably located in conduit means 26, required to maintain the actual reflux flow rate through conduit means 26 substantially equal to the desired flow rate represented by signal 90. Signal 112 is provided from flow controller 104 as a control signal to control valve 114 and control valve 114 is manipulated in response thereto.

In a similar manner flow transducer 116 in combination with flow sensing device 117, provides an output signal 118 which is representative of the actual flow rate of fluid in conduit means 36. Signal 118 is provided as a process variable input to reflux flow controller 106. In response to signals 118 and 92 flow controller 106 provides an output signal 120 which is responsive to the difference between signals 118 and 92. Signal 120 is scaled so as to be representative of the position of control valve 122 required to maintain the actual flow rate through conduit means 36 substantially equal to the desired flow rate represented by signal 92. Signal 120 is provided from flow controller 106 as a control signal to control valve 122 and control valve 122 is manipulated in response thereto.

Level controller 181, which is operably located so as to maintain a desired liquid level in accumulator 20, manipulates control valve 190 to regulate the amount of the feed contained in the liquid fraction withdrawn through conduit means 28. In a similar manner level controllers 182 and 184 maintain desired liquid levels in sections 40 and 44 of distillation tower 10, and manipulate control valves 192 and 194 respectively to regulate the amount of the feed that is contained in the liquid fractions withdrawn through conduit means 32 and 34 respectively.

Figure 2:
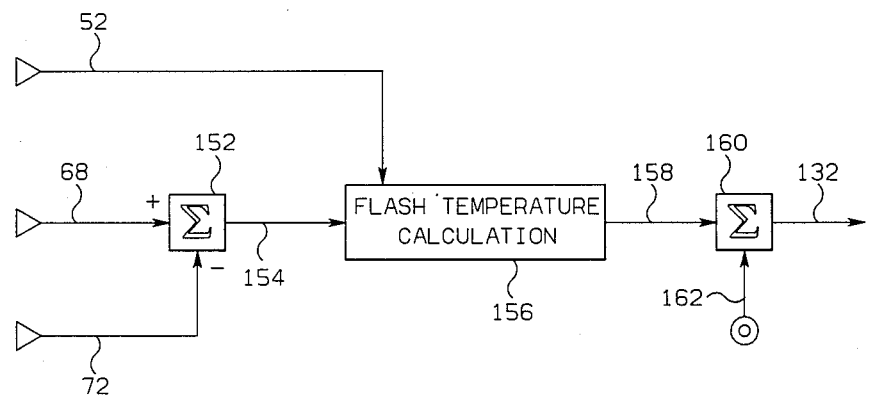
FIG. 2 is a block diagram of the preferred computer logic utilized to calculate the cut point temperature for each section of the tower illustrated in FIG. 1.
Figure 3:
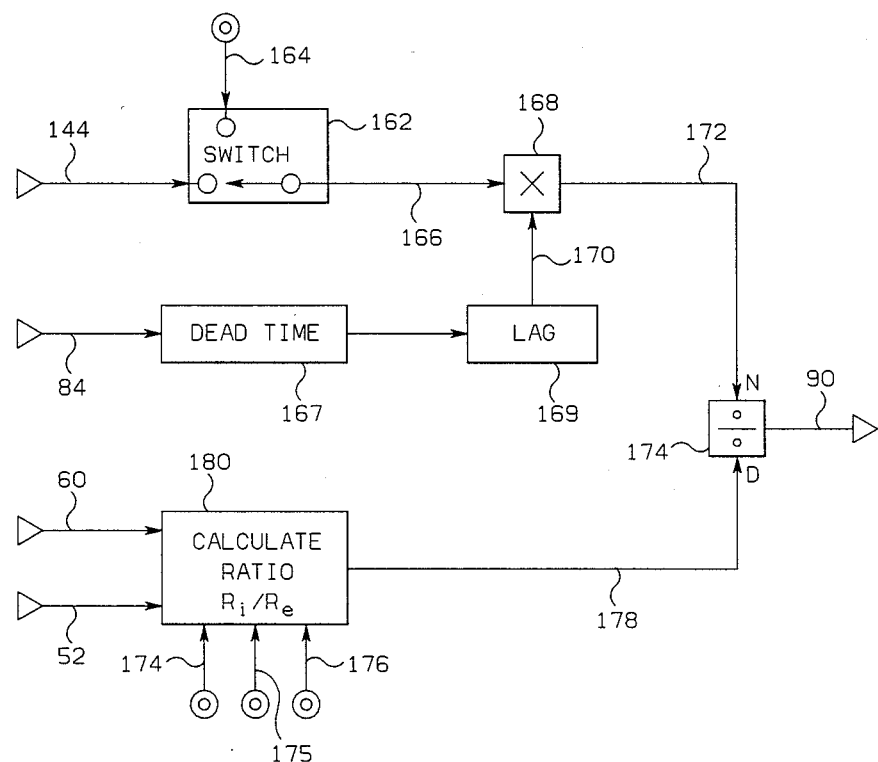
FIG. 3 is a block diagram of the preferred computer logic utilized to calculate the reflux flow for each section of the tower illustrated in FIG. 1.

Before referring specifically to the computer logic utilized to calculate control signals 90 and 92, which are illustrated in FIGS. 2 and 3, it is noted that many of the factors that affect correlation of vapor pressure and boiling point corrections for commercial mixtures are unknown. However, a vapor pressure and boiling point correction for normal paraffin hydrocarbon and petroleum fractions is found on page 208, FIG. 5-27, of a textbook entitled "Petroleum Refinery Engineering", 4th Edition, by W. L. Nelson, 1958, McGraw-Hill, hereinafter referred to as Nelson. Using this Figure in Nelson, which is a nomogram, a boiling point at atmospheric conditions may be determined from a knowledge of the vapor pressure and temperature under vacuum conditions. By considering the differential pressure between the respective draw tray and the top of the tower to approximate the partial pressure of the vapor in a particular section of the tower, and using the actual vapor temperature in a section of the distillation tower 10, a "flash temperature" can be determined from the Figure in Nelson. The thus determined flash temperature possesses certain atributes that resemble a cut point temperature, and is used in combination with an experimentally determined constant as a cut point temperature for control purposes.

Referring now to FIG. 2, there is illustrated the logic for computer block 130 illustrated in FIG. 1. It is noted that the inputs illustrated in FIG. 2 correspond to the upper section 40 of distillation tower 10 illustrated in FIG. 1. Although not illustrated, it is obvious that the computer logic section corresponding to FIGS. 2 and 3 would be provided for each section of the tower 10.

Signal 72 which is representative of the actual pressure at tray 42 in tower 10 is provided as a first input to summation block 152. Signal 68 which is representative of the vapor pressure at the top of distillation tower 10 is provided as a second input to summation block 152. Signal 72 is subtracted from signal 68 in summation block 152 to establish signal 154, which is representative of the difference between signals 68 and 72. As previously indicated signal 154 is considered to be the vapor pressure in the upper section 40 of distillation tower 10. Signal 154 is provided as a first input to the flash temperature calculation computer block 156. Signal 52 which is representative of the vapor temperature in the upper section 40 of distillation tower 10 is provided as a second input to computer block 156.

If the vapor pressure and temperature of a petroleum fraction are known, the boiling point of the petroleum fraction at atmospheric conditions which is referred to herein as a "flash temperature", may be determined directly from the nomogram disclosed by Nelson. For example to determine the flash temperature illustrated in computer block 156 it is only necessary that the information relating the flash temperature to vapor pressure and temperature had been entered into the computer 100, and stored in the computer in a format which permits recovery of the information. For example, sets of related numbers for the flash temperature and the corresponding vapor pressure and vapor temperature can be entered into the computer and the flash temperature corresponding to the measured vapor pressure and temperature can be quickly found and retrieved. If desired interpolation between desired points can be utilized to achieve a desired accuracy.

Computer block 156 provides an output signal 158 which is representative of the flash temperature for the petroleum fraction in section 40 of distillation tower 10. Signal 158 is provided as a first input to summation block 160. Signal 162 which is representative of a constant term is provided as a second input to summation block 160. Signal 160 is an experimentally determined constant which can be entered by an operator. Typically, the constant 62 will be updated whenever a laboratory analysis report is received. Updating amounts to reversing calculations to find constants for the calculations from actual qualities. Then, if desired, constants from several consecutive updatings can be averaged to obtain a new updated constant.

Summation block 160 provides an output signal 132 which is representative of the cut point between the overhead fraction withdrawn through conduit means 28 and the fraction withdrawn through conduit means 32. Signal 132 is provided from computer block 130 as a process variable input to cut point temperature controller 136. In a similar manner a cut point signal 134 which is representative of the cut point between the side cut fraction withdrawn through conduit means 32 and through conduit means 34 is provided from computer block 130 as a set point signal to cut point temperature controller 138.

Referring now to FIG. 3, there is illustrated the computer logic utilized to convert the internal reflux to feed ratio represented by signal 144 to the desired flow rate of external reflux ($R_e$) represented by signal 90. Signal 144 which is representative of the internal reflux to feed ratio necessary to maintain the inferred cut point temperature represented by signal 132 substantially equal to the desired cut point temperature represented by signal 140, is provided as a first input to switch 162. Signal 164 which is representative of an operator entered value for a desired internal reflux to feed ratio, is provided a second input to switch 162. Generally signal 144 will be selected by switch 162 to provide signal 166. However, if it is desired to manually adjust the internal reflux to feed ratio, signal 164 will be selected by switch 162 to provide signal 166. Signal 166 is provided from switch 162 as a first input to a multiplying block 168.

Signal 84 which is representative of the actual feed rate to distillation tower 10, is passed through a dead time block 167 and a lag block 169. The thus modified flow signal is provided from lag block 169 as signal 170 as a second input to multiplying block 168. Signal 170 is both delayed with respect to the measured feed flow and lagged with a first order lag when it is provided as an input signal to multiplication block 168. The dead time provided by block 166 and the lag time constant provided by block 168 are adjusted to compensate the feed flow to the actual reflux flow so that the reflux flow calculation can utilize the feed flow signal. Signal 166 is multiplied by signal 170 in multiplication block 168 to provide signal 172. Signal 172, which is representative of the desired internal reflux in section 40 of distillation tower 10, is provided as a first input to division block 174.

Signal 60 which is representative of the actual temperature of the reflux flowing in conduit means 26, is provided as a first input to the calculate ratio $R_i/R_e$ computer block 180. As used herein the internal reflux ($R_i$) is the combination of external reflux ($R_e$) returned to the tower and the vapor that is condensed by temperature equilibrium when the cooler external reflux contacts the somewhat warmer vapor in the fractionation tower. Signal 52 which is representative of the vapor temperature at the top of the distillation column 10 is provided as a second input to computer block 180. Signals 174, 175 and 176, which are respectively representative of the specific heat of the external reflux the heat of vaporization of the external reflux, and the heat of vaporization of the internal reflux, are provided as inputs to computer block 180. In response to the above-described inputs computer block 180 calculates the ratio of internal reflux ($R_i$) to external reflux ($R_e$) in accordance with the following reflux equation:

$$R_i/R_e = [1 + (C_p/\lambda)\Delta T](\lambda/HR_i)$$

where:

$R_i$ = internal reflux flow rate in a section of distillation tower 10. (lbs/hr)

$R_e$ = external reflux flow rate for a section of distillation tower 10. (lbs/hr)

$C_p$ = specific heat of external reflux (BTU/lb. °F.)

$\lambda$ = heat of vaporation of the external reflux (BTU/lb).

$\Delta T$ = temperature difference of internal and external reflux. (°F.)

$HR_i$ = heat of vaporization of the internal reflux.

This reflux equation is developed in U.S. Pat. No. 4,096,574, issued Jan. 20, 1978 to David A. Christie. This patent shows other apparatus which can be employed to solve the reflux equation and control a fractionation tower in response to the calculation. Signal 178 is provided as a second input to division block 174. Signal 172 is divided by signal 178 in division block 174 to provide signal 90, which as previously stated is utilized as a set point signal for reflux flow controller 104.

The invention has been described in terms of a presently preferred embodiment as illustrated in FIGS. 1, 2 and 3. Specific components used in the practice of the invention as illustrated in FIG. 1 such as temperature transducers 50, 54, 58 and 62, pressure transducers 66, 70, 74, flow transducers 80, 108 and 116, flow sensors 82, 109 and 117, controllers 104, 106, 181, 182 and 184, control valves 114, 122, 190, 192 and 194 are each well known, commercially available control components such as described at length in Perry's Chemical Engineers Handbook, 4th ed. Chapt. 22, McGraw-Hill.

For reasons of brevity, conventional auxiliary fractionation equipment such as pumps, additional heat exchangers, additional measurement and control devices, etc. have not been included in the above description as they play no part in the explanation of the invention.

While the invention has been described in terms of the presently preferred embodiment, reasonable variations and modifications are possible by those skilled in control systems art and such variations and modifications are within the scope of the described invention and the appended claims.

That which is claimed is:

1. Apparatus comprising:
    a fractional distillation tower;
    means for providing a feed oil stream containing hydrocarbons to said fractional distillation tower, wherein the hydrocarbon components of said feed oil stream exhibit a sufficiently wide boiling range to yield a plurality of fractions;
    a first total drawoff tray located at a first point along the length of said fractional distillation tower, wherein the volume of said fractional distillation tower above said first total drawoff tray defines a first section;
    means for maintaining a desired liquid level above said first total drawoff tray, wherein said first section includes a first liquid zone and a first vapor zone;
    means for withdrawing an overhead vapor fraction from said fractional distillation tower;
    condenser means for at least partially condensing said overhead vapor fraction;
    means for withdrawing a first liquid fraction from said condenser means;
    means for providing a first reflux stream at a second point along the length of said fractional distillation tower, wherein said second point is located in the upper part of said first vapor zone;
    means for withdrawing a second liquid fraction from said fractional distillation tower, wherein said second liquid fraction is withdrawn from said first total drawoff tray;
    means for withdrawing a bottom fraction from said fractional distillation tower;
    means for establishing a first signal representative of the vapor pressure at the top of said fractional distillation tower;
    means for establishing a second signal representative of the pressure differential between said first total drawoff tray and the top of said fractional distillation tower;
    means for establishing a third signal representative of the vapor temperature in said first vapor zone;
    computer means, operatively connected to respond to said second signal and said third signal, for establishing a fourth signal which is representative of the cut point temperature between said first liquid fraction and said second liquid fraction;
    means for establishing a fifth signal representative of a desired cut point temperature between said first liquid fraction and said second liquid fractions;
    means for comparing said fourth signal and said fifth signal and for establishing a sixth signal which is responsive to the difference between said fourth signal and said fifth signal; and
    means for manipulating the flow rate of said first reflux stream in response to said sixth signal to thereby maintain said fourth signal substantially equal to said fifth signal.

2. Apparatus in accordance with claim 1, wherein said computer means for establishing a fourth signal which is representative of the cut point temperature between said first liquid fraction and said second liquid fraction additionally comprises:
    memory means, associated with said computer means, for storing a mathematical relationship relating vapor pressure and temperature of petroleum fractions which are under vacuum conditions to a boiling point temperature under atmospheric conditions;
    means for retrieving said boiling point temperature corresponding to the vapor pressure represented by said second signal and the temperature represented by said third signal; and
    means for modifying said boiling point temperature by adding a predetermined constant to said boiling point temperature to establish said fourth signal.

3. Apparatus in accordance with claim 1 wherein said means for withdrawing a first liquid fraction from said condenser means comprises:

a cooling means;

an overhead vapor accumulator means;

means for passing said overhead vapor fraction through said cooling means to said accumulator means, wherein said overhead vapor fraction is at least partially condensed by said cooling means;

means for regulating the liquid level in said accumulator means; and means for withdrawing said first liquid fraction from said accumulator means.

4. Apparatus in accordance with claim 3 wherein said means for regulating the liquid level in said accumulator means comprises:

conduit means for withdrawing said first liquid fraction from said accumulator means;

a control valve operably located in said conduit means; and a liquid level controller means operatively connected to said accumulator means and to said control valve, wherein said liquid level controller manipulates said control valve so as to regulate the liquid level in said accumulator means.

5. Apparatus in accordance with claim 1 wherein said sixth signal is scaled so as to be representative of the internal reflux/feed ratio required to maintain said fourth signal substantially equal to said fifth signal, and wherein said means for manipulating the flow rate of said first reflux stream additionally comprises;

a multiplying means;

means for providing said sixth signal as a first input to said multiplying means;

means for establishing a seventh signal representative of the actual flow rate of said feed oil stream;

a dead time means;

a means for passing said seventh signal through said dead time means to establish an eighth signal which is representative of said seventh signal delayed by the dead time of said dead time means;

a lag means;

means for passing said eighth signal through said lag means to establish a ninth signal which is representative of said eighth signal delayed by the time constant of said lag means;

means for providing said ninth signal as a second input to said multiplying means;

means for multiplying said ninth signal and said sixth signal in said multiplying means to establish a tenth signal which is representative of the internal reflux flow required to maintain said fourth signal substantially equal to said fifth signal; and means for manipulating the flow rate of said first reflux stream in response to said tenth signal.

6. Apparatus in accordance with claim 5, said apparatus additionally comprising:

means for establishing an eleventh signal representative of the actual temperature of said first reflux stream;

means for establishing a twelfth signal representative of the temperature difference between said third signal and said eleventh signal;

means for establishing a thirteenth signal representative of the specific heat for said first reflux streams;

means for establishing a fourteenth signal representative of the heat of vaporization for said external reflux stream;

means for calculating in said computer means, responsive to said twelfth, thirteenth and fourteenth signals, a fifteenth signal which is representative of the ratio of the internal reflux to external reflux for said first reflux stream;

means for dividing said tenth signal by said fifteenth signal to establish a sixteenth signal which is representative of the flow rate of said first reflux stream required to maintain said fourth signal substantially equal to said fifth signal; and means for manipulating said first reflux stream in response to said sixteenth signal.

7. Apparatus in accordance with claim 6 wherein said apparatus additionally comprises:

a select means having at least two inputs and an output;

means for providing said sixth signal as a first input to said select means;

means for establishing a seventeenth signal which is an operator entered signal representative of a desired ratio of internal reflux to feed for said first liquid reflux stream, and for providing said seventeenth signal as a second input to said select means;

means for providing said output of said select means as said first input to said multiplying means; and means for causing said select means to select said seventeenth signal when it is desired to manually adjust said internal reflux to feed ratio.

8. Apparatus in accordance with claim 2, said apparatus additionally comprising:

a second total drawoff tray located at a third point along the length of said fractional distillation tower, wherein said third point is below said first point, and wherein the volume of said fractional distillation tower between said first point and said third point defines a second section;

means for maintaining a desired liquid level above said second total drawoff tray wherein said second section includes a second liquid zone and a second vapor zone;

means for providing a second reflux stream at a fourth point along the length of said fractional distillation tower, wherein said fourth point is located in the upper part of said second vapor zone;

means for withdrawing a third liquid fraction from said fractional distillation tower, wherein said third liquid fraction is withdrawn from said second total drawoff tray;

means for establishing a seventh signal representative of the vapor temperature in said second vapor portion of said fractional distillation tower;

means for establishing an eighth signal representative of the pressure difference between said second total drawoff tray and the top of said fractional distillation tower;

means for establishing in said computer means, a ninth signal which is representative of the cut point temperature between said second liquid fraction and said third liquid fraction;

means for establishing a tenth signal representative of a desired cut point temperature between said second liquid fraction and said third liquid fraction;

means for comparing said ninth signal and said tenth signal and for establishing an eleventh signal responsive to the difference between said ninth signal and said tenth signal; and means for manipulating the flow rate of said second reflux stream in response to said eleventh signal to thereby maintain said ninth signal substantially equal to said tenth signal.

9. Apparatus in accordance with claim 8 wherein said first reflux stream is a portion of said first liquid fraction, and said second reflux stream is a portion of said third liquid fraction.

10. Apparatus in accordance with claim 1 wherein said fractional distillation tower is a feedstock vacuum tower, and said first liquid fraction is a light vacuum gas oil and said second liquid fraction is a heavy vacuum gas oil.

11. A method for maintaining a desired cut point between fractions withdrawn from a fractional distillation tower, wherein a feed oil stream containing hydrocarbons is distilled in said tower, wherein the hydrocarbon components of said feed oil stream exhibit a sufficiently wide boiling point range to yield a plurality of fractions, wherein a total drawoff tray is located at a first point along the length of said fractional distillation tower, wherein the volume of said fractional distillation tower above said total drawoff tray defines a section of said fractional distillation tower, wherein an overhead vapor stream is withdrawn from an upper portion of said fractional distillation tower, cooled, and then provided to an overhead accumulator, said method comprising the following steps:
　　maintaining a liquid level above said drawoff tray, such that said section of said fractional distillation tower includes a liquid zone and a vapor zone;
　　withdrawing a first liquid fraction from said overhead accumulator;
　　providing a reflux stream at a second point along the length of said fractional distillation tower wherein said second point is located above said first point in the upper part of said vapor zone;
　　withdrawing a second liquid fraction from said fractional distillation tower from said total drawoff tray;
　　withdrawing a bottom fraction from said fractional distillation tower;
　　establishing a first signal representative of the vapor pressure at the top of said fractional distillation tower;
　　establishing a second signal representative of the pressure differential between said total drawoff tray and the top of said fractional distillation tower;
　　establishing a third signal representative of the vapor temperature in said vapor zone;
　　establishing a fourth signal which is representative of the cut point temperature between said first liquid fraction and said second liquid fraction;
　　comparing said fourth signal and said fifth signal and for establishing a sixth signal responsive to the difference between said fourth signal and said fifth signal; and
　　manipulating the flow rate of said reflux stream in response to said sixth signal to thereby maintain said fourth signal substantially equal to said fifth signal.

12. A method in accordance with claim 11 wherein said step for establishing a fourth signal which is representative of the cut point temperature between said first liquid fraction and said second liquid fraction comprises:
　　storing a mathematical relationship relating the vapor pressure and temperature of a petroleum fraction under vacuum conditions to a boiling point temperature under atmospheric conditions in a memory means;
　　retrieving said boiling point temperature corresponding to the vapor pressure represented by said second signal and the temperature represented by said third signal from said memory means; and
　　modifying said boiling point temperature wherein a constant is added to said boiling point temperature to establish said fourth signal.

13. A method in accordance with claim 12 wherein the following steps precede said step of withdrawing a liquid reflux stream from said overhead accumulator:
　　at least partially condensing said overhead vapor stream, and holding the condensed liquid in said overhead accumulator; and
　　regulating the liquid level in said overhead accumulator.

14. A method in accordance with claim 11 wherein said sixth signal is scaled so as to be representative of the internal reflux to feed ratio required to maintain said fourth signal substantially equal to said fifth signal, and wherein said step of manipulating the flow rate of said reflux stream in response to said sixth signal additionally comprises:
　　establishing a seventh signal representative of the actual flow rate of said feed oil stream;
　　passing said seventh signal through a dead time means to establish an eighth signal which is representative of said seventh signal delayed by said dead time means;
　　passing said eighth signal through a lag means to establish a ninth signal which is representative of said eighth signal delayed by the time constant of said lag means;
　　multiplying said ninth signal and said sixth signal to establish a tenth signal which is representative of the internal reflux flow required to maintain said fourth signal substantially equal to said fifth signal; and
　　manipulating said reflux stream in response to said tenth signal.

15. A method in accordance with claims 14 additionally comprising the steps of:
　　establishing an eleventh signal representative of the actual temperature of said first reflux stream;
　　establishing a twelfth signal representative of the temperature difference between said third signal and said eleventh signal;
　　establishing a thirteenth signal representative of the specific heat for said first reflux stream;
　　establishing a fourteenth signal representative of the heat of vaporization for said first reflux stream;
　　calculating, responsive to said twelfth, thirteenth and fourteenth signals, a fifteenth signal which is representative of the ratio of the internal reflux to external reflux for said first reflux stream;
　　dividing said tenth signal by said fifteenth signal to establish a sixteenth signal which is representative of the flow rate of said reflux stream required to maintain said fourth signal substantially equal to said fifth signal; and
　　manipulating said first reflux stream in response to said sixteenth signal.

* * * * *